INVENTORS
ARTHUR J. KAVANAGH
CHARLES J. KOESTER
MILTON R. THORBURN
ROBERT B. TACKABERRY
BY
James P. McAndrews
ATTORNEY

United States Patent Office 3,348,547
Patented Oct. 24, 1967

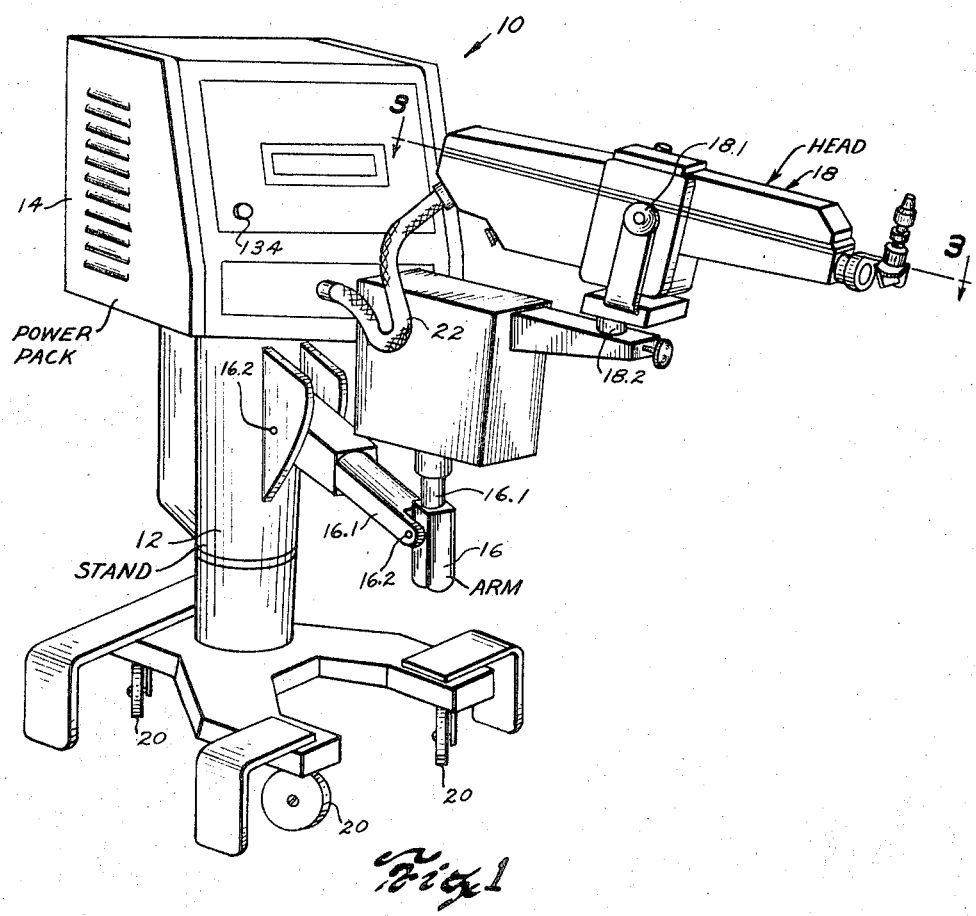
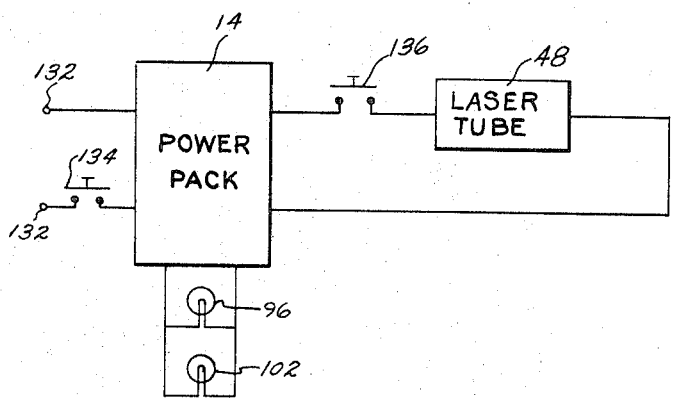

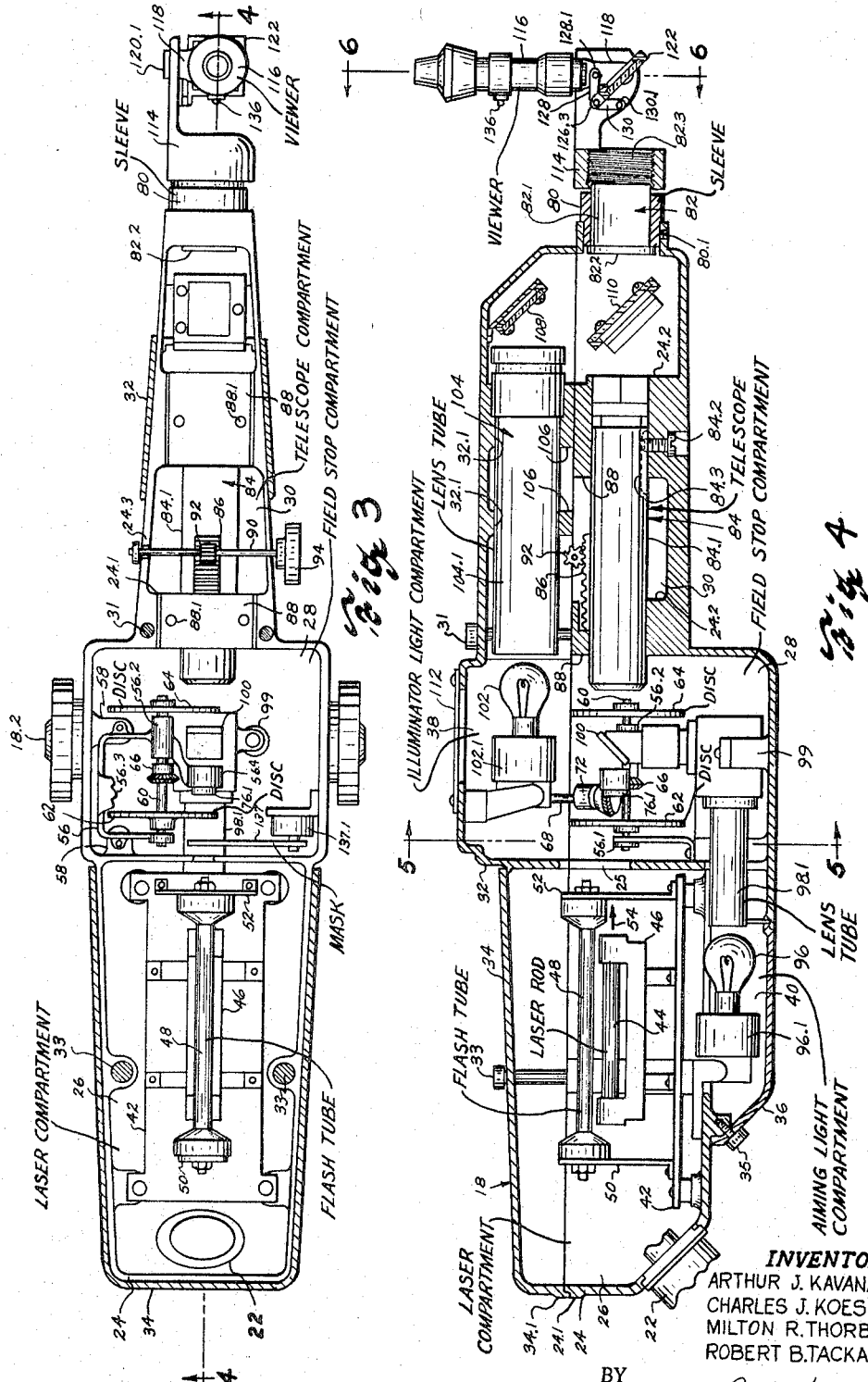

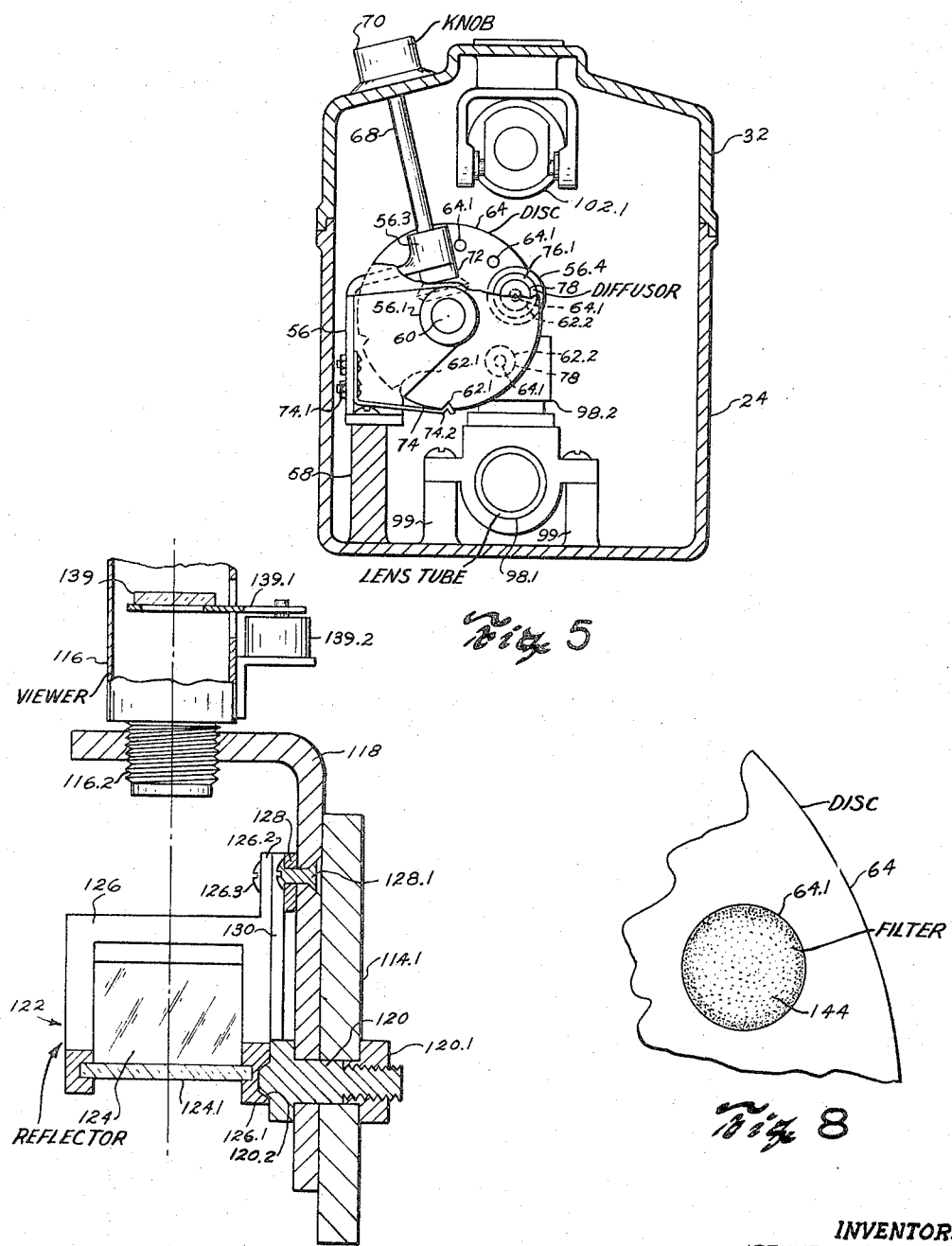

3,348,547
PHOTOCOAGULATING APPARATUS
Arthur J. Kavanagh, Southbridge, Mass., Charles J. Koester, South Woodstock, Conn., Milton R. Thorburn, Southbridge, Mass., and Robert B. Tackaberry, Tonawanda, N.Y., assignors, by mesne assignments, to American Optical Company, Southbridge, Mass., a corporation of Delaware
Filed Oct. 16, 1964, Ser. No. 404,217
7 Claims. (Cl. 128—395)

ABSTRACT OF THE DISCLOSURE

An improved apparatus for photocoagulating the retina of the human eye. A first optical system is disposed between an intense light source and a field stop, and a second optical system is disposed between the field stop and the eye. An adjustable afocal telescope is positioned between the field stop and the second optical system to compensate for differences in the refractive media of an abnormal eye. Two additional low-intensity light sources are provided, one for effecting focusing of the intense light source, and the other for illuminating a relatively large part of the fundus of the eye.

The field of this invention is that of photocoagulating apparatus and the invention relates more particularly to novel and improved apparatus for photocoagulating the retina of the human eye.

The process called photocoagulation has been developed primarily to treat or overcome retinal detachments in the human eye by fusing the retina of the eye to the choroid. However, photocoagulation can also be used to destroy tumors, to prevent the spread of disease and in many other ways known to the medical profession. As applied to chorioretinal coagulation, the photocoagulation process calls for the application of an intense beam of radiant energy to the cornea of an eye in such a manner that the energy is focused on a selected part of the retina of the eye by the eye lens and other refractive media of the eye. In this way, the retina and choroid can be coagulated or congealed together at the focal point of the radiant energy to overcome the retinal detachment.

When radiant energy is applied to an eye in this manner, the energy tends to be rapidly dissipated by the eye. For this reason, the beam of radiant energy used in photocoagulation must be very intense and must be focused on the retina with high efficiency in order to achieve the desired coagulation of the retina in a very brief period of time before other parts of the eye become overheated by the radiant energy. On the other hand, as photocoagulation destroys the tissue of the eye in the area of the eye being coagulated, an effective photocoagulation apparatus must also be adapted to focus that intense energy only upon a carefully sized and selected part of the retina most likely to achieve the desired retinal attachment.

It is an object of this invention to coagulate the retina of the human eye; to achieve photocoagulation of the retina in a novel and improved manner; to provide a novel and improved photocoagulation apparatus which can concentrate a very intense beam of radiant energy on a selected part of the retina of an eye for photocoagulating said part of the retina; and to provide such a novel and improved apparatus which utilizes a laser for supplying an extremely intense beam of coagulating light.

Further objects of this invention are to provide a photocoagulating apparatus which can direct a maximum amount of light or other radiant energy through the pupil of an eye to be concentrated upon the retina of the eye; to provide such an apparatus which can be regulated in accordance with the refractive media of a myopic, emmetropic or hyperopic eye to focus radiant energy upon the retina of any selected eye; to provide such an apparatus which can be regulated to coagulate a spot of a selected size on the retina of an eye; to provide such an apparatus which can coagulate a spot of selected size on the retina to a uniform extent throughout the entire area of the spot; to provide such an apparatus which can be regulated to coagulate a spot of selected size on the retina to a controlled extent varying throughout the area of the retinal spot; and to provide such a novel and improved photocoagulating apparatus which can be very conveniently and accurately regulated for accomplishing these results.

It is also an object of this invention to provide a photocoagulating apparatus having means for illuminating the fundus of an eye prior to photocoagulation of the eye; to provide such an apparatus which can be very accurately aimed relative to an eye prior to the time that the apparatus is actuated to effect coagulation of the eye; to provide such an apparatus which can be aimed by directing light of relatively low intensity onto an eye to be concentrated upon a selected part of the retina and which can thereafter be actuated for focusing a very intense beam of light onto the same selected part of the retina for coagulating the retina at the location of said focused light; and to provide such an apparatus having means which permit careful observation of the eye during illumination of the fundus, during aiming of the apparatus using said lower intensity light, and during actuation of the apparatus to direct said intense light onto the eye for coagulating the retina of the eye.

Other objects of this invention are to provide such a novel and improved photocoagulating apparatus which is of simple, rugged and relatively inexpensive construction; to provide such an apparatus which can be conveniently operated; to provide such an apparatus in which apparatus components are protected from damage such as might be caused by the concentration of intense radiant energy within the apparatus; and to provide such an apparatus having a range of adjustment such that it is adapted for use in photocoagulating the retina of almost any eye likely to be encountered.

Briefly described, the photocoagulating apparatus provided by this invention includes a source of intense light, a field stop, first optical means disposed between the light source and field stop, and second optical means adapted to be arranged between the field stop and an eye in telecentric relation to the pupil of the eye. In accordance with this invention, the first and second optical means cooperate to image the light source at the pupil of the eye for directing a maximum amount of coagulating light through the eye pupil. In addition, the second optical means cooperates with the refractive media of the eye to image the field stop at the retina of the eye for coagulating the retina at the location of the retinal image. The size of the field stop is preferably adjustable for adjusting the size of the spot to be coagulated on the retina of the eye.

In a preferred construction, the light source is disposed at the first principal focus of the first optical means for directing light from the source through the field stop and an afocal telescope is positioned between the field stop and the second optical means. In this construction, the position of the afocal telescope can be adjusted to form an intermediate image of the field stop at the first principal focus of the second lens means or at a selected location on either side of said first principal focus. When this intermediate image is formed at the first principal focus of the second lens means, the second lens means can direct parallel light rays onto an emmetropic or normal eye so that the light is focused by the refractive media of the eye for forming the desired image of the field stop on the retina of the eye. Alternatively, where the eye to be coagulated is myopic or hyperopic, the afocal telescope can be adjusted to form the intermediate image of the field stop at one side or the other of the first principal focus of the second lens means to compensate for differences in the refractive media of the abnormal eye, whereby the second lens means can direct light onto the myopic or hyperopic eye to form a correspondingly sized image of the field stop on the retina of said abnormal eye. As the second optical means is located in telecentric relation to the eye, the first and second optical means cooperate to form an image of the light source at the pupil of the eye regardless of the position of adjustment of the afocal telescope, thereby to assure that a maximum amount of coagulating light is directed through the pupil of the eye.

In a practical embodiment of this invention, the source of intense light incorporated in the photocoagulating apparatus comprises a laser actuable to emit an intense beam of substantially collimated, monochromatic light. In a preferred construction, however, a light diffuser such as a ground glass member is disposed at the first principal focus of the first optical means and a laser is adapted to direct a beam of intense light onto the diffuser. In this way, the diffuser functions as an intense light source which is of substantially uniform intensity throughout its area. Preferably the field stop of the invented apparatus is located at the second principal focus of the first optical means and the diffuser located at the first principal focus thereof is provided with selected diffusing properties such that the first optical means forms a uniformly intense image of the far field of the diffuser at the field stop to substantially fill the field stop opening. In this way, a maximum amount of the laser light output can be directed through the field stop. In addition, the field stop is relatively uniformly illuminated so that all parts of the image of the field stop formed on the retina of an eye can be of uniform intensity to achieve a uniform retinal coagulation. Alternatively, a light-absorbing member is disposed within the field stop, the absorbing member having absorbing properties which are greater near the edge of the field stop than at the center of the stop. In this way, the image of the field stop formed on the retina of an eye is controlled to be of varying intensity from the center to the outer edge of the image for controlling the extent to which each part of the retina is coagulated at the location of the retinal image. In an advantageous construction, the invented apparatus incorporates a plurality of field stops of different sizes and also incorporates a plurality of diffusers of different diffusing properties. The different field stops can then be selectively employed for achieving photocoagulation of different sized spots on the retina of an eye and different diffusers can be employed with respective field stops in order to uniformly illuminate the differently sized stops with a maximum intensity of laser light.

In a preferred embodiment, the apparatus of this invention includes not only a first optical system, a field stop, a source of intense light actuable at the first principal focus of the first optical system for directing light from the intense source through the field stop, a second optical system arranged between the field stop and an eye, and an afocal telescope disposed between the field stop and second optical system but also includes an additional optical system and a source of light of lower intensity. The low intensity light is preferably located at the first principal focus of the additional optical system for directing the low intensity light through the field stop in the same manner as the high intensity light. The afocal telescope and second optical system then cooperate with the refractive media of the eye to form an image of the field stop at the retina of the eye. In this arrangement, the apparatus can be positioned or aimed relative to an eye when the lower intensity light source has been actuated, thereby to form an image of the field stop on a selected part of the retina of the eye using the low intensity light. Thereafter, the high intensity light source can be actuated to provide an intense beam of light which is then focused upon the same selected part of the retina to coagulate that part of the retina. In a practical construction, a partially-transmitting partially-reflecting mirror is interposed between said light sources and the field stop for partially-transmitting and partially-reflecting light from the respective sources through the field stop.

In another preferred embodiment of the invention, the apparatus can incorporate a second low intensity light source and optical means for directing light from the second low intensity source onto an eye for illuminating a relatively large part of the fundus of the eye. This embodiment of the invented apparatus also preferably includes beam splitter means for partially-transmitting and partially-reflecting light from the various apparatus light sources onto an eye. In a desirable embodiment of the invention, the photocoagulating apparatus also includes another partially-transmitting and partially-reflecting mirror which serves to reflect light from the apparatus light sources onto an eye while permitting observation of the eye through the mirror. This embodiment of the invention also preferably includes optical means for facilitating viewing of the fundus of an eye through said partially-transmitting viewing mirror.

Other objects, advantages and details of construction of the photocoagulating apparatus of this invention appear in the following detailed description of a preferred embodiment of the invention, the detailed description referring to the drawings in which:

FIG. 1 is a perspective view of the photocoagulating apparatus of this invention;

FIG. 2 is a schematic diagram illustrating operation of the apparatus of FIG. 1;

FIG. 3 is a sectional view to enlarged scale along line 3—3 of FIG. 1;

FIG. 4 is a sectional view along line 4—4 of FIG. 3;

FIG. 5 is a sectional view along line 5—5 of FIG. 4;

FIG. 6 is a sectional view along line 6—6 of FIG. 4;

FIG. 8 is a partial view illustrating an alternative embodiment of this invention.

Figure 7:
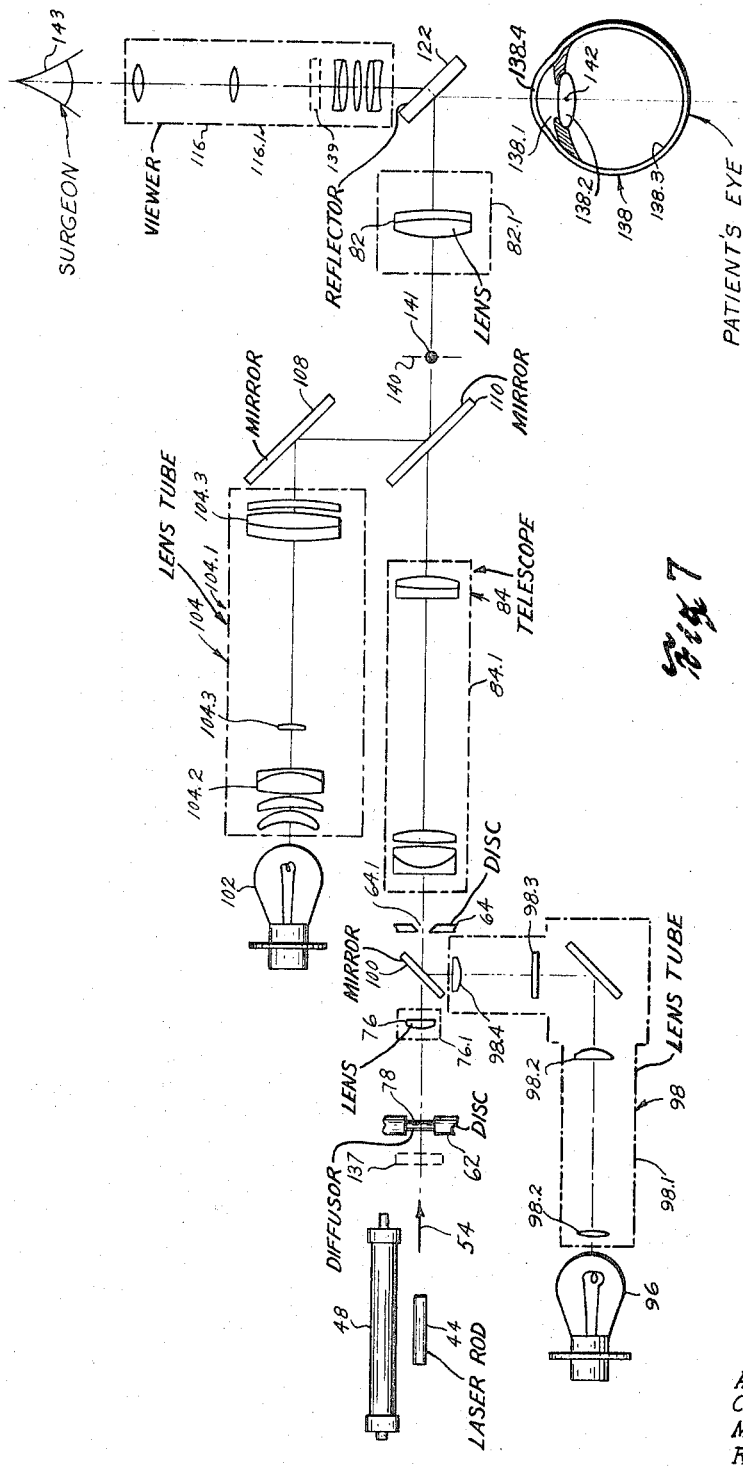
FIG. 7 is a diagrammatic view illustrating the arrangement of optical components in the apparatus of FIG. 1.

Referring to the drawings, 10 in FIG. 1, indicates the novel and improved photocoagulating apparatus of this invention which is shown to include a stand 12, an electrical power supply 14 and a movable arm 16 adapted to support the head portion 18 of the apparatus. Casters 20 are preferably provided on the stand to permit convenient movement of the apparatus alongside a surgical operating table or the like (not shown). Sections 16.1 of the movable arm are pivotably connected to the stand and to each other at 16.2 and the head 18 is preferably mounted on the arm 16 for pivotal movement at 18.1 and for rotation around the shaft 18.2. Preferably, means (not shown) are provided for releasably locking the arm sections and head in selected positions of adjustment. The weight of the apparatus head 18 on the movable arm is also preferably counterbalanced within the stand 12 in any conventional manner (not shown). As such a stand and arm construction is quite conventional, it will not be described further herein and it will be understood that it can have any desired construction within the scope of this invention which permits the apparatus head 18 to be conveniently moved into and held in any desired position above an operating table for use on a patient reclining on the table. A flexible cable means 22 serves to conduct electrical power from the power supply 14 to the head 18 in any position of head adjustment.

Referring to apparatus head 18 with particular reference to the mechanical arrangement of the head, it can be seen in FIGS. 3 and 4 that the head includes a principal housing member 24 which defines a laser compartment 26, a field stop compartment 28 and a telescope compartment 30. The head 18 also includes a principal cover member 32 which defines an illuminator light compartment 38; a cover member 34 which encloses the laser compartment 26 noted above; and a cover member 36 which defines another compartment 40 for enclosing an aiming light means. In a preferred construction, each of these housing and cover members comprises an aluminum alloy casting or the like having interfitting edges as indicated, for example, at 24.1 and 34.1 in FIGS. 3 and 4. In addition the cover members are preferably secured to the principal housing 24 by the use of studs 31, 33 and 35 threadedly engaged with the housing 24 as shown in FIGS. 3 and 4.

Within the laser compartment 26, the head 18 is provided with a platform 42. A laser rod 44 is then mounted on a bracket 46 attached to the platform and a flash tube 48 is mounted above the laser rod by a bracket 50 and a V-shaped bracket 52 also attached to the platform. The laser rod preferably comprises a ruby rod adapted to emit an intense, substantially collimated beam of monochromatic light of 0.694 micron wavelength as indicated in FIG. 4 by the arrow 54, and the flash tube 48 comprises a source of laser pumping light which is adapted to stimulate emission of the light beam 54 when the flash tube is actuated. However, the laser rod could also comprise a rod of neodymium-doped glass or other suitable laser material within the scope of this invention, the flash tube being adapted to provide the appropriate pumping light for the selected laser material. Preferably also, the flash tube and laser rod can be enclosed in a suitable light-reflecting means (not shown) in conventional manner for directing a maximum amount of light from the flash tube onto the laser rod for stimulating emission of the light beam 54. In addition, if desired, suitable means (not shown) can be disposed in the laser compartment for cooling the laser means within the compartment. The housing 24 is apertured as at 25 to permit transmission of the laser light beam 54 between the housing compartments 26 and 28 and the V-shaped bracket 52 is, of course, proportioned to provide clearance for passage of the light beam 54 between legs of the bracket as will be understood.

Within the field stop compartment 28, a bracket 56 is mounted on bosses 58. See FIG. 3. This bracket supports a rotatable shaft 60 between journals 56.1 and 56.2 on the bracket. Two relatively large discs 62 and 64 and a level gear 66 are then fixedly secured to the shaft for rotation with the shaft. The bracket 56 also supports another rotatable shaft 68 in the journal 56.3 (see FIG. 5), this shaft having a knob 70 and a bevel gear 72 fixedly attached to opposite ends of the shaft. The bracket journal 56.3 is cut away in FIG. 3 for clarity of illustration. The knob 70 is located outside the housing compartment 28 as shown in FIG. 5 and the bevel gear 72 meshes with the bevel gear 66 so that knob rotation serves to rotate the discs 62 and 64 around the axis of shaft 60. Preferably, a spring 74 is attached to the bracket 56 by screws 74.1 and bears against the disc 62, the spring end 74.2 being adapted to snap into notches 62.1 in the disc for regulating rotation of both discs 62 and 64. The bracket 56 also preferably supports a first lens means 76 (see FIG. 7) within a lens tube 76.1 at the end of bracket arm 56.4 as is illustrated in FIGS. 3–5 and 7.

In the preferred embodiment of this invention, the disc 62 has a plurality of apertures 62.2 arranged in radially spaced relation to each other around the periphery of the disc, and a ground glass member or other suitable light diffusor 78 is secured within each disc aperture. For clarity of illustration, the disc 62 is shown partially cut away in FIG. 5 and only two diffusors 78 are shown in the illustrated portion of the disc. However, it will be understood that additional diffusors 78 are preferably mounted in the portion of the disc 62 which is not shown. The disc 62 is proportioned so that, as the disc is rotated on the shaft 60 by turning of the knob 70, each diffusor 78 in the disc is successively aligned between the laser rod 44 and the first optical means 76 in the tube 76.1 to intercept the intense light beam 54 which is emitted from the laser rod. Similarly, the other disc 64 is provided with a plurality of different sized apertures 64.1 which are aligned with respective diffusors 78 in the disc 62. As will be understood, the discs 62 and 64 rotate together on the shaft 60 so that the disc apertures 64.1 are also adapted to be successively aligned with the first optical system 76 to serve as field stops for the optical system. This alignment of diffusors 78, apertures 64.1 and the first optical system 76 is best illustrated in FIG. 5 of the drawings in which the disc 62 is shown partially cut-away, thereby to clearly illustrate one diffusor 78 in the disc 62 and one aperture or field stop 64.1 in the disc 64 in the described alignment with the lens means 76. In this arrangement, the diffusor 78 intercepts the laser beam 54 and serves to diffuse the laser light output while the first optical system 76 directs light from the diffusor through the aperture 64.1 in the disc 64 aligned with the optical system 76. The notches 62.1 in the disc 62 are, of course, located to engage the spring end 74.2 when respective diffusors 78 and apertures 64.1 are aligned with the laser light beam 54 to releasably hold the discs 62 and 64 in said position of alignment.

At the end of the apparatus housing 24, a sleeve 80 is fixed in position by a set screw 80.1. A second optical system or lens means 82 enclosed in a lens tube 82.1 is then rotatably mounted within the sleeve and is retained in the sleeve by a ring 82.2 which is threadedly engaged on the end of the tube 82.1 in conventional manner. In addition, an afocal telescope means 84 in a tube 84.1 is positioned within the housing compartment 30 and is adapted for sliding axial adjustment of the position of the afocal telescope means within the compartment. That is, the housing is provided with bearing portions 24.2 in the compartment 30 to slidingly support the telescope tube 84.1. A screw 84.2 threadedly engaged with the housing then extends into a slot 84.3 in the telescope tube for preventing rotation of the tube. Further a rack gear 86 is attached to the telescope tube and saddle blocks 88 are attached to the housing 24 by screws 88.1 as shown particularly in FIGS. 3 and 4. A shaft 90 mounting a pinion 92 and knob 94 is then journaled in slots 24.3 in the housing. In this construction, the knob 94 can be rotated for moving the telescope tube 84.1 axially within the compartment 30. As will be understood, the second optical system 82 and the afocal telescope means 84 are optically aligned with the first optical system 76 and with the field stop aperture 64.1 in the disc 64 which is aligned with the optical system 76, whereby light from the laser rod 44 transmitted through said field stop aperture 64.1 is further transmitted by the afocal telescope means 84 and second optical system 82.

The apparatus head 18 also mounts a lamp 96 in a socket 96.1 within the housing compartment 40. This lamp is of conventional type such as a tungsten filament lamp adapted to emit polychromatic light of substantially lower intensity than the light 54 emitted from the laser rod 44. An additional optical system 98 is enclosed in the lens tube means 98.1 and is mounted in the housing 24 on bosses 99. This optical system directs lower intensity light from the lamp 96 through the field stop aperture 64.1 aligned with the optical system 76. A partially-transmitting partially-reflecting mirror 100 or other beam splitter means is preferably disposed between this aligned aperture and the optical systems 76 and 98 for partially-transmitting light 54 from the laser through the aligned aperture 64.1 and for partially-reflecting light from the lamp 96 through the same aligned aperture. In an advantageous construction, the mirror 100 comprises a dichroic mirror adapted for high transmission of monochromatic light of the wavelength emitted from the laser rod 44 and for high reflection of visible light of other wavelengths. Of course, the compartment cover 36 is removable to permit replacement of the lamp 96.

In the preferred embodiment of this invention, the apparatus head 18 also mounts a lamp 102 in a socket 102.1 within the housing compartment 28. This lamp is also of conventional type such as a tungsten filament lamp adapted to emit polychromatic light of relatively lower intensity than the laser light 54. Another additional optical system 104 enclosed in lens tube 104.1 is then mounted in the housing cover 32 in conventional manner. For example, the lens tube 104.1 is supported within the cover 32 on cover portions 32.3 shaped to receive the lens tube. Saddle blocks 106 fitted around the lens tube are then secured to the cover 32 by screws (not shown) for holding the lens tube 104.1 in fixed position within the cover. A mirror or other reflector 108 is mounted within the cover 32 in optical alignment with the lens system 104. In addition, a partially-transmitting partially-reflecting mirror 110 or other beam splitter means is preferably mounted between the afocal lens system 84 and second optical system 82. In this arrangement, the optical system 104 cooperates with the mirror 108 to direct low intensity light from the lamp 102 onto the mirror 110, which light is then reflected from the mirror 110 into the lens system 82. The mirror 110 is also adapted to cooperate with the afocal telescope system 84 to partially transmit high intensity light from the laser 44 and low intensity light from the lamp 96 through the mirror 110 into said second optical system 82. In an advantageous construction, the mirror 110 is dichroic and is adapted for high transmission of monochromatic light of the wavelength emitted from the laser rod 44 and for about 50% transmission and 50% reflection of the polychromatic light from the lamps 96 and 102. Of course, the auxiliary cover 112 on the principal cover 32 is removable for permitting replacement of the lamp 102.

As noted above, the lens tube 82.1 is adapted to be rotated in the sleeve 80. The lens tube is also threadedly engaged at 82.3 with a collar 114 which has an arm or extension 114.1 extending forward from one side of the collar. As shown particularly in FIGS. 4 and 6, a viewing means 116 is mounted in a tube 116.1 and is secured as at 116.2 in an L-shaped bracket 118 which in turn is pivotally mounted on the collar extension 114.1 by a stud 120 and nut 120.1. This viewing means preferably comprises a one-third power electing telescope having sufficient depth of focus so that, when brought adjacent to an eye to be coagulated, both the pupil and the retina of the subject eye can be seen through the telescope at the same time. The telescope 116 is also preferably adjustable to compensate for any refractive errors of the person viewing through the telescope as will be understood.

A reflector means 122 is then mounted on the collar arm 114.1 for movement with the viewing means 116 in a conventional manner. For example, the reflector means preferably includes a partially-reflecting partially-transmitting mirror 124 which is held with a frame 126. The frame 126 is recessed at 126.1 to receive one end 120.2 of the stud mounting the viewing means 116 so that the mirror frame is adapted to be rotated around the axis of the stud 120, which axis preferably intersects the reflecting surface 124.1 of said mirror. The mirror frame 126 also preferably has an ear 126.2 which is pivotally engaged with toggle arms 128 and 130 as at 126.3. The toggle arm 128 is pivotally connected to the viewing means bracket 116 as at 128.1 while the arm 130 pivotally engages the collar extension 114.1 as at 130.1.

In this arrangement, the reflector 122 intercepts monochromatic light from the laser rod 44 and polychromatic light from the low intensity sources 96 and 102 as the light is transmitted through the optical system 82. This light is then reflected from the reflector 122 along a selected path and the viewing means 116 is arranged to view along the same path through the mirror. In a preferred construction, the partially-transmitting mirror 126 is dichroic and is adapted for high reflectance of monochromatic laser light and for about 50% transmission and 50% reflection of polychromatic light from the lamps 96 and 102. When the viewing means is manipulated to pivot around the stud 120, movement of the viewing means through a given angle moves the mirror 122 through an angle equal to one-half the given angle. In this way, the mirror 122 is adapted to reflect light along a different selected path while the viewing means is simultaneously arranged to view along said different path as will be understood. Further, the viewing means 116 and mirror 122 can also be rotated around the axis of the optical system 82 by rotating the lens tube 82.1 in the sleeve 80. Thus the mirror can be adjusted to reflect light in almost any selected direction and the viewing means can be arranged to view in any such direction.

Referring to the electrical aspects of the photocoagulating apparatus 10, it can be seen that the apparatus power supply 14 is connected to any suitable power source outside the apparatus as is diagrammatically indicated by the terminals 132 in FIG. 2. The apparatus is also adapted to be energized by closing of a switch 134. In a practical embodiment of this invention, the light sources 96 and 102 are energized by closing of the switch 134 through leads (not shown) which extend into the apparatus head 18 through the flexible cable 22. However, the light sources could also be provided with separate switch means within the scope of this invention. The apparatus 10 also preferably includes means such as the push-button switch 136 for selectively energizing the laser flash tube through leads (not shown) which extend into the head 18 through the cable 22, thereby to stimulate emission of a pulse of laser energy 54 from the laser rod 44 whenever desired. As shown in FIG. 4, the switch 136 is preferably mounted on the viewing means 116 so that the surgeon operating the photocoagulating apparatus 10 con conveniently close the switch while observing through the viewing means. However many other conventional arrangements could also be employed for controlling energization of the lamps 96 and 102 and the flash tube 48. As these means can be completely conventional, they are not described further herein and it will be understood that any suitable means for energizing the lamps and for selectively actuating the tube are within the scope of this invention.

In a preferred embodiment of this invention, a blade-like mask 137 is mounted on the shaft of a conventional rotary solenoid 137.1 as shown in FIG. 3 and is normally positioned to intercept the laser beam 54, thereby to provide protection against inadvertent firing of the laser. The solenoid is adapted to be connected to the power supply 14 in any conventional manner (not shown) to move the mask out of the path of the laser beam 54 when desired upon closing of the switch 136 as will be understood. Similarly, a light filter member 139 is preferably mounted on an arm 139.1 on another solenoid 139.2 as shown in FIG. 6 and is normally positioned out of the line of sight of the viewing means 116. This filter is adapted for relatively high absorption of monochromatic light of the wavelength emitted by the laser rod 44 and for relatively high transmission of light of other wavelengths. This solenoid is also adapted to be connected to the power supply 14 in any conventional manner (not shown) to move the filter into the line of sight of the viewing means to protect the vision of the surgeon operating the apparatus whenever the apparatus is actuated to emit the laser beam 54.

Referring now to the optical features of the photocoagulating apparatus 10 as shown in FIG. 7, it can be seen that the apparatus includes an intense source of light formed by the laser 44 and a selected diffuser 78, a first optical system 76, a field stop formed by a selected disc aperture 64.1, an axially adjustable afocal telescope 84, and a second optical system 82. The apparatus further includes a low intensity light source 96 and an additional optical system 98 together with another low intensity light source 102 and another additional optical system 104. It will also be understood that the apparatus head 18 is adapted to be adjusted over a patient reclining on an operating table (not shown) so that the viewing means 116 is arranged to observe the patient's eye 138 through the dichroic mirror 122 and so that light transmitted by the lens system 82 is adapted to be reflected from the mirror 122 in the patient's eye.

As previously noted, the laser rod 44 is actuable to emit an intense beam of substantially monochromatic light 54 and comprises a source of high intensity light capable of achieving photocoagulation of the retina of an eye. However, although such a laser light beam can have a beam spread of only a fraction of a degree so that it appears substantially collimated, such a laser beam will not usually be of uniform intensity. That is, if an image is formed of the light-emitting end of the laser rod or of the far field of the laser light beam, it can be seen that all parts of the image will not be of uniform intensity. Therefore in accordance with this invention, the ground glass diffusor 78 is arranged as shown in FIG. 7 to intercept, transmit and diffuse the laser beam 54 whereby the diffusor itself serves as a relatively uniform source of intense light.

In the preferred embodiment of this invention, the first optical system 76 is arranged to project light from the diffusor 78 through the partially-transmitting mirror 100 and through the field stop 64.1 aligned with the optical system. Preferably, the diffusor 78 is located at the first principal focus of the optical system 76 so that the optical system projects an image of the illuminated diffusor through the field stop to infinity. Preferably, also the field stop 64.1 is located at the second principal focus of the optical system 76 and the diffusing properties of the diffusor 78 are selected in accordance with the size of the field stop 64.1, whereby the optical system 76 images the far field of the diffusor 78 at the field stop to just barely fill the field stop aperture. In this way, a maximum amount of light from the laser 44 is directed through the field stop 64.1 while still achieving uniform illumination of the field stop.

It has been noted above that the apparatus disc 64 is adapted to be rotated to selectively arrange field stops 64.1 of different sizes in alignment with the first optical system. It has also been noted that the apparatus disc 62 mounts a number of diffusors 78 and is rotated with the disc 64 to selectively arrange the different diffusors in alignment with the optical system 76 with the respective field stops 64.1. In the preferred embodiment of this invention, these diffusors 78 have different diffusing properties so that the optical system 76 is adapted to image the far fields of each different diffusor on its respective field stop as the diffusor and field stop are aligned with the optical system, thereby to substantialy fill each differently sized field stop with light while directing a maximum amount of light through the field stop.

In accordance with this invention, the lens means 98.2 within the optical system 98 are adapted to form an image of the light source 96 upon a glass screen 98.3 within the optical system. In this way, the glass screen itself can be considered to function as a source of relatively low intensity polychromatic light. Another lens means 98.4 within the optical system then serves to project parallel light rays from the illuminated screen so that light rays are reflected from the mirror 100 through the field stop 64.1 to illuminate the field stop and to tend to form an image of the light source 96 at infinity.

In the preferred embodiment of this invention, the afocal telescope 84 is adapted to intercept light directed through the field stop 64.1 to form an intermediate image of the field stop at a point indicated at 140 in FIG. 7. As the afocal telescope is axially adjustable, the intermediate field stop image 140 can normally be arranged to fall at the first principal focus 141 of the optical system 82 or can be adjusted to fall at either side of the first principal focus 141. The optical system 82 is also provided with a relatively long focal length so that when the apparatus head 18 is positioned relative to a patient's eye 138, the optical system 82 can be arranged so that the second principal focus of the system falls at the point 142 within the pupil 138.1 in telecentric relation to the patient's eye.

In this arrangement, when the telescope 84 forms the intermediate image 140 at the first principal focus 141 of the optical system 82, the optical system 82 is adapted to project parallel light rays from the intermediate image to form another image of the field stop at infinity. This parallel light is then reflected from the mirror 122 into the eye 138. If this eye is a normal or emmetropic eye, these parallel light rays are then focused by the eye lens 138.2 and other refractive media of the eye to form an image of the field stop 64.1 on the retina 138.3 of the eye. Alternatively, where the eye 138 is myopic or hyperopic so that the refractive media of the eye are not adapted to focus parallel light rays on the retina, the afocal telescope 84 can be readily adjusted to form the intermediate field stop image 140 at a selected location on one side or the other of the first principal focus 141. The optical system 82 can then direct light from the intermediate field stop image onto the eye with greater or lesser divergence or convergence as required so that the refractive media of the eye 138 can focus said light on the retina 138.3 to form an image of the field stop on the retina.

An important advantage of this arrangement is that when the optical system 98 projects parallel light rays from the light source 96 through the field stop 64.1 to image the light source at infinity, the afocal telescope and optical system 82 cooperate to focus said parallel light rays to image the light source 96 at the eye pupil. Similarly, when the laser 44 is actuated to illuminate a diffusor 78 so that the optical system 76 projects parallel light rays through the field stop tending to image the diffusor at infinity, the afocal telescope and optical system 82 also cooperate to image the diffusor at the eye pupil. In either event, this arrangement assures that a substantial amount of light from the low intensity source 96 or the high intensity laser source is directed through the pupil 138.1 into the patient's eye. As the afocal telescope itself does not serve to focus parallel light rays transmitted through the field stop 64.1, the position of axial adjustment of the afocal telescope relative to lens system 82 does not alter the imaging of the laser and low intensity light sources at the eye pupil.

In addition, lenses means 104.2 within the optical system 104 are adapted to image the light source 102 upon a glass screen 104.3 within the system 104. Another lens means 104.4 within the optical system then serves to project light from the screen 104.3 so that it is reflected from the mirrors 108 and 110 through the optical system 82. When the optical system 82 is located in telecentric relation to the eye 138, the lens system 104 cooperates with the system 82 to form an image of the light source 102 at the eye pupil 138.1, thereby to direct a substantial amount of low intensity polychromatic light through the pupil for illuminating the fundus of the eye. Typically, the optical system 104 may have a selected focal length such that the illuminating light beam transmitted by the pupil illuminates a fundus area subtending an angle of 20°, whereby a substantial part of the fundus is illustrated to be observed through the viewing means 116.

In operating the photocoagulating apparatus 10 of this invention, the apparatus is actuated by closing of the switch 134 to energize the lamps 96 and 102. The apparatus is then positioned over the eye 138 of a patient reclining on a table (not shown) as is diagrammatically indicated in FIG. 7. The apparatus head 18 is first adjusted in a general way to permit a surgeon to view the patient's eye through the viewing telescope 116 and mirror 122. The viewing telescope can be adjusted to compensate for any errors in the surgeon's vision in conventional manner as will be understood. Then the head 18 is further adjusted to dispose the second principal focus of the optical system 82 at the point 142 in telecentric relation to the patient's eye.

When the apparatus head has been located in this way, the optical system 104 cooperates with the optical system 82 to form an image of the light source 102 at the eye pupil, which image can be seen by the surgeon indicated at 143 in FIG. 7 viewing through the telescope 116. This low intensity light from the source 102 serves to illuminate the fundus of the eye so that the surgeon operating the apparatus 10 can carefully select the area of the retina 138.3 where coagulation can best be performed. As the viewing means 116 preferably comprises a one-third power telescope having a substantial depth of focus, the surgeon is able to view the images formed on both the pupil and retina of the patient's eye to assure that light is not permitted to fall inadvertently upon the iris of the patient's eye.

When the apparatus head has been located in this way, the optical system 98 also cooperates with the light source 96 to illuminate the field stop 64.1 and further cooperates with the afocal telescope 84 and the optical system 82 to image the light source 96 at the pupil of the patient's eye. The surgeon is thus able to axially adjust the afocal telescope 84 to compensate for any refractive error of the patient's eye to form low intensity light image of the field stop 64.1 on the retina of the eye. The viewing means 116 and mirror 122 are then further adjusted as required until the image of the field stop formed on the retina coincides with the selected part of the retina to be coagulated. If desired, the surgeon also adjusts the control knob 70 on the apparatus head to select the proper size of field stop 64.1, thereby to regulate the size of the field stop image formed at the retinal area to be coagulated.

When these adjustments have been made, the apparatus 10 is properly aimed relative to the patient's eye for achieving photocoagulation of the desired area of the patient's retina. The switch 136 is then closed for actuating the laser flash tube and to stimulate emission of a brief but very intense pulse of monochromatic light energy 54 from the laser 44 to brilliantly illuminate the selected diffusor 78. The optical system 76 then cooperates with the afocal telescope 84 and optical system 82 to form an image of the diffusor 78 at the patient's pupil to direct a maximum amount of laser light into the patient's eye. In addition, the afocal telescope and the optical system 82 cooperate with refractive media of the patient's eye to form a high intensity laser light image upon the selected part of the patient's retina for actually accomplishing the desired retinal coagulation at the location of this retinal image. The light filter 139 is positioned so that the surgeon can view the actual occurrence of the coagulation without fear of injury to the surgeon's eye by exposure to the laser light.

Where the field stop 64.1 comprises a clean, uniformly illuminated aperture on the disc 64 as above described, the high intensity light image found on the retina will have relatively uniform light intensity and will achieve substantially uniform coagulation of the retina across the entire area of the retinal image. However, where an absorber such as coated glass filter or the like 144 is fitted within a selected field stop aperture as indicated in FIG. 8, and where the absorber has greater optical density near the edge than at the center of the absorber as indicated by the shading in FIG. 8, the image of the field stop formed as the retina of the patient's eye will be of varying intensity across the retinal image. As a result, the retina will be coagulated to a greater extent near the center of the image than at the edge of the image as will be understood. Of course, other absorbers having other variable density projectors could also be used in this manner for controlling the photocoagulation of the patient's retina.

It has been noted above that the optical system 82 is preferably provided with a relatively long focal length so that the system can be conveniently positioned relative to a patient's eye in telecentric relation to the eye. In a desirable construction, the optical system 82 has a back focal length of about 73.7 mm. and is spaced at a fixed distance of approximately 40 mm. from the mirror 122 for accomplishing this result.

It is also advantageous to arrange the afocal telescope 84 relative to the optical system 82 and the field stop 64.1 so that a reasonably short axial adjustment of the afocal telescope can serve to adjust the apparatus 10 to compensate for the refractive errors of most eyes likely to be encountered. In a desirable apparatus where the optical system has a back focal length of about 73.7 mm. as above described, the field stop apertures 64.1 in the disc 64 range in size from 0.47 to 2.33 mm. in diameter and the afocal telescope 84 is adapted to provide 3 power lateral magnification. In this arrangement, axial adjustment of the afocal telescope for a distance of approximately 24 mm. serves to adjust the apparatus 10 to coagulate eyes having refractive media connectible by lenses ranging from −12 to +18 diopters. In addition, the apparatus is adapted to coagulate retinal areas of suitable size which subtend angles ranging from 1° to 5° at the pupil of a patent's eye.

It has been noted above that the optical systems 98 and 104 are adapted to image the light sources 96 and 102 respectively upon the glass screens 98.3 and 104.3 within the systems. It has also been noted that the screens 98.3 and 104.3 as well as each diffusor 78 in the apparatus disc 62 are preferably provided with an opaque central spot. When this is done, light which is concentrated at the pupil of the patient's eye to image the light sources and diffusor within the pupil as above described does not reflect back from the cornea 138.4 of the patient's eye toward the surgeon's eye 143. This permits the surgeon a better view of the fundus of the eye and for that reason facilitates operation of the photocoagulation apparatus.

It has also been noted above that the afocal telescope system 84 is adapted to form an intermediate image 140 of the field stop 64.1 at or on either side of the first principal focus of the optical system 82. It will also be understood that when the laser 44 is actuated to emit the intense light beam 54, this concentration of energy at the location of this intermediate field stop image can be very intense. Preferably also, in the apparatus of this invention, the optical system 82 and the afocal telescope means 84 comprise color-corrected doublet lens means so that light from the polychromatic aiming light source and from the monochromatic laser light source are adapted to be focused on the same retinal area. In accordance with this invention, all lens means such as the optical system 82 and the lens means 84.4 in the afocal telescope comprise uncemented lens units so that the lens units will not be destroyed by exposure to such concentrations of intense light energy.

It should be understood that the preferred embodiments of this invention described above have been described by way of illustration but that many modifications of the described apparatus could be made within the scope of this invention. For example, although the laser 44 has been described as emitting an intense beam of light to illuminate a diffusor 78 located at the first principal focus of the optical system 76, it is also within the scope of this invention to locate the light-emitting end of the laser rod itself at said first principal focus. Further, other intense light sources could be substituted for the laser within the scope of this invention. It should be understood that this invention includes all modifications and equivalents of the described inventions which fall within the scope of the appended claims.

We claim:

1. Photocoagulating apparatus comprising a first optical system, field stop means of selected size, a laser actuable to emit a beam of intense light, light-diffusing means interposed in said light beam, said diffusing means being arranged at the first principal focus of said first optical system so that said first optical system directs light from said diffusing means through said stop, and a second optical system adapted to be arranged between said stop and an eye in telecentric relation to the pupil of said eye, said first and second optical systems being cooperable to form an image of said diffusing means at said eye pupil, said second optical system being cooperable with the refractive media of said eye to form an image of said stop at the retina of said eye for photocoagulating said retina at the location of said retinal image.

2. Photocoagulating apparatus as set forth in claim 1 in which said field stop means is disposed at the second principal focus of said first optical system so that said first optical system forms an image of the far field of said diffusing means at said field stop.

3. Photocoagulating apparatus comprising a first optical system, field stop means of adjustable size disposed at the second principal focus of said first optical system, laser means actuable to emit a beam of intense light, light-diffusing means interposed in said light beam at the first principal focus of said first optical system so that said first optical system directs light from said diffusing means through said stop and forms an image of the far field of said diffusing means at said stop, said diffusing means being adjustable to vary diffusing properties at said first principal focus so that said far field image substantially corresponds in size to said field stop means, and a second optical system adapted to be arranged between said stop and an eye in telecentric relation to the pupil of said eye, said first and second optical systems being cooperable to form an image of said diffusing means at said eye pupil, said second optical system being cooperable with the refractive media of said eye to form an image of said stop at the retina of said eye for photocoagulating said retina at the location of said retinal image.

4. Photocoagulating apparatus comprising first lens means, field stop means embodying a disc having a plurality of field stops of different sizes arranged in radially spaced relation around a central axis, light-diffusing means embodying a plurality of ground glass diffusers mounted in radially spaced relation to each other around axis, means for rotating said field stop means around its central axis for disposing a selected field stop at the second principal focus of said lens means, means for rotating said light-diffusing means around its central axis for disposing a selected diffuser at the first principal focus of said lens means, laser means actuable to direct a beam of intense light through said selected diffuser at said first principal focus so that said lens means directs light from said diffuser through said selected field stop at said second principal focus and forms an image of the far field of said selected diffuser at said selected stop, said diffusers having different diffusing properties so that the far field images of said diffusers formed by said lens means are adapted to fill respective field stops, and second lens means adapted to be arranged between said stop and an eye in telecentric relation to the pupil of said eye, said first and second lens means being cooperable to form an image of said selected diffuser at said eye pupil, said second lens means being cooperable with the refractive media of said eye to form an image of said selected field stop at the retina of said eye for photocoagulating said retina at the location of said retinal image.

5. Photocoagulating apparatus comprising a first optical system, field stop means of selected size, light-absorbing means disposed at said stop, said light-absorbing means being of different density at the center of said stop than at the edge of said stop, a source of intense light arranged at the first principal focus of said optical system for directing light from said source through said stop and absorbing means, and a second optical system adapted to be arranged between said stop and an eye in telecentric relation to the pupil of said eye, said first and second optical systems being cooperable to image said source at the location of said eye pupil, said second optical system being cooperable with the refractive media of said eye to form an image of said stop at the retina of said eye, said image being of different intensity at the center thereof than at the edge thereof for photocoagulating said retina to a controlled extent at the center of said retinal image and to a different extent at the edge of said retinal image.

6. In photocoagulating apparatus having a source of intense light, field stop means of selected size, and means directing light through said stop onto an eye, said light-directing means being cooperable with the refractive media of the eye to form an image of said stop on the retina of said eye for photocoagulating said retina at the location of said retinal image, light-absorbing means disposed at said stop, said light-absorbing means being of lesser density at the center of said stop than at the edge of said stop for photocoagulating said retina to a controlled extent at the center of said retinal image and to a lesser extent at the edge of said retinal image.

7. Photocoagulating apparatus comprising first lens means, field stop means, a source of intense light actuable at the first principal focus of said first lens means for directing light from said intense source through said stop means, second lens means adapted to be arranged between said stop means and the pupil of an eye for directing light to said eye, third lens means disposed between said stop means and said second lens means, a first source of low-intensity light, an additional optical system for directing said first low-intensity light through the pupil of said eye for illuminating a relatively large area of the retina of said eye, said third lens means being cooperable with said first and second lens means to form an image of said intense light source at the pupil of said eye, a second source of low-intensity light, and means for directing said second low-intensity light to the pupil of said eye along the same path taken by said intense light past said stop means, said third lens means being cooperable with said second lens means and the refractive media of said eye to form an image of said stop means on said retina for focusing said second low-intensity light and for photocoagulating said retina with said intense light at the location of said retinal image.

References Cited

UNITED STATES PATENTS

| | | | |
|---|---|---|---|
| 2,930,379 | 3/1960 | Dopp et al. | 128—396 |
| 3,084,694 | 4/1963 | Kavanagh et al. | 128—396 |
| 3,096,767 | 7/1963 | Gresser et al. | 128—395 |

RICHARD A. GAUDET, *Primary Examiner.*

SIMON BRODER, *Examiner.*